A. A. VALENTINE & H. A. MORRISON.

Umbrella-Rib Tips.

No. 8,073. Reissued Feb. 5, 1878.

Witnesses:

T. C. Brecht.

Wm. B. Dale

Inventors:

A. A. Valentine.

Henry A. Morrison.

By James L. Norris.

Attorney.

N. PETERS, PHOTO-LITHOGRAPHER, WASHINGTON, D. C.

UNITED STATES PATENT OFFICE.

ALFRED A. VALENTINE, OF NEW YORK, AND HENRY A. MORRISON, OF BROOKLYN, N. Y.

IMPROVEMENT IN UMBRELLA-RIB TIPS.

Specification forming part of Letters Patent No. 184,675, dated November 21, 1876; Reissue No. 8,073, dated February 5, 1878; application filed January 5, 1878.

*To all whom it may concern:*

Be it known that we, ALFRED A. VALENTINE, of New York city, New York, and HENRY A. MORRISON, of Brooklyn, New York, have invented certain new and useful Improvements in Umbrellas and Parasols, of which the following is a specification:

This invention relates to certain improvements in the means of attaching and securing the covers of umbrellas, parasols, and like articles, to the outer ends of the ribs thereof; and has for its object the securing of such covers, so that they will not be cut or chafed by the attaching devices.

In umbrellas, as ordinarily constructed, the covering has been generally attached to the ends of the ribs by means of a thread sewed through the material of the cover and passing through an aperture in the extremity of the rib. As thus constructed the securing-thread has a tendency to wear or cut out the material of the covering, and weaken it to such an extent as to allow the covering to break at such points, and speedily render the umbrella useless. Besides, in the means as thus described of securing the covering to the ends of the ribs, it required skilled labor in stitching the covering to the ribs.

Our invention is specially designed to overcome both these objections; and to this end it consists, first, in the combination, with an umbrella-rib and its cover, of a compressible metallic cap for securing the cover upon the rib, said cap being constructed with an inward blunt projection, in such manner that when clamped or compressed upon the cover it will not cut the same; second, in providing the outer extremities of the umbrella-ribs with a shoulder or a recess, (preferably of an annular form,) over or into which the material of the cover can be folded and secured by means of a divided collar, having corresponding recesses or shoulders on the interior and a shank upon the outside, over which is adapted to fit a cap or tip, which secures the two parts of the collar together, as more fully hereinafter set forth; third, in an umbrella-rib tip having an inward blunt bead or flange at or near its lower edge, between which bead or flange and the rib the umbrella-cover may be clamped without being cut.

Figure 1:
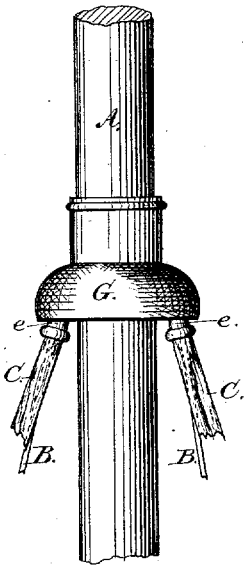
Figure 2:
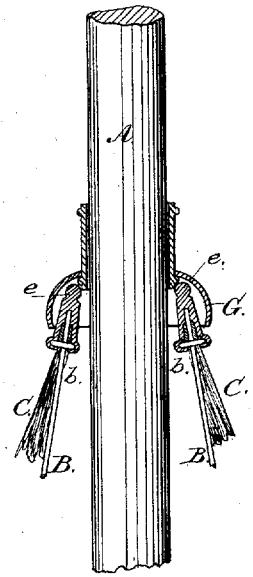
Figure 3:
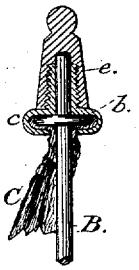
Figure 4:
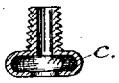
Figure 5:
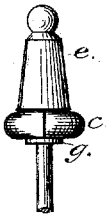
Figure 6:
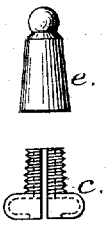
Figure 10:
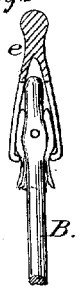
Figure 9:
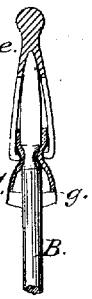
Figure 11:
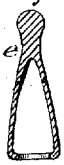
Figure 8:
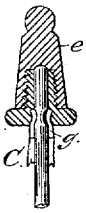
Figure 7:
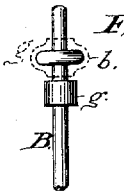

In the drawings, Figure 1 represents an elevation of an umbrella staff or rod, showing the tips of the ribs in position under the shield of the umbrella. Fig. 2 is a sectional view of the same. Fig. 3 represents a view of the extremity of the tip, showing the divided collar and cap for securing the material around the annular shoulder at the extremity of the rib. Fig. 4 represents a detached view of one-half of the divided collar. Fig. 5 represents a view of the split collar and cap secured upon the end of the rib. Fig. 6 represents detached views of the split collar and cap; Fig. 7, a view of the end of the rib, showing the annular shoulder and rubber washer slipped below the same; Fig. 8, a modification, showing the groove in the end of the rib and the projection on the interior of the split collar; Fig. 9, a modification, showing the split collar and cap constructed in one piece. Fig. 10 shows the tip compressed upon an ordinary umbrella-rib; and Fig. 11 shows the cap or tip separate.

The letter A represents the shaft or rod of the umbrella, and B the ribs of the same, attached thereto in the ordinary manner. The outer extremities of said ribs may be provided each with a shoulder, *b*, preferably of annular form, over which the material C of the cover may be gathered; and the letter *c* represents a divided collar, having a corresponding recess on the inside and a screw-shank on the outside, the recess being adapted to fit over the shoulder on the extremity of the rib, and secure the covering of the umbrella over the same.

The letter *e* represents a screw cap or tip, adapted to fit over a screw-shank of the divided collar and confine the two parts together, for the purpose of securing the covering of the umbrella between the same and the annular shoulder on the extremities of the ribs, as shown in Figs. 2, 3, and 4.

To prevent undue wear or cutting out of the material of the covering, where confined between the divided collar and the ribs, I prefer to interpose a washer, *g*, of rubber or other elastic material, which will give slightly when the umbrella is raised and the cover stretched, thus relieving the strain upon the material at the point of attachment.

The recess or projection may be omitted from the rib, and the intermediate collar dispensed with, and the tip or cap simply compressed upon the end of the plain rib B′, as shown in Fig. 10, but having, as will be understood, the cover between it and the rib.

The general form of the cap or tip is shown in Figs. 9, 10, and 11. It must have an interior chamber long enough to extend over a sufficient length of the rib to allow it to inclose so much of the edge of the cover as will give it a firm hold; and, in order that the cover may not be cut or chafed by the clamping-edge or bead of the tip, said edge is rounded or rendered blunt, substantially as shown in Figs. 9, 10, and 11.

The advantage of our improvement will be be apparent from the above description. The covering is secured at its center in the ordinary manner; but the edges are secured to the extremities of the ribs by means of the binding action of the compressible tip upon the material, securing the same over the annular shoulders or upon the plain rib without stitching, the tips serving the same purpose as the projecting ends of the ordinary ribs—to conduct off the water, and to be engaged and held under the shield of the umbrella-handle when the umbrella is folded, as shown.

The ribs may be made with either an annular groove or a projection, preferably of an annular form. When the groove is used, a corresponding projection should be made on the interior of the divided collar or of the tip, as shown in Fig. 8; and instead of the cap and collar, when a collar is used, being made separate, they may be formed in one piece, as shown in Fig. 9, the sides being slightly elastic, so as to confine the fabric between the projection and recess when the collar is forced over the end of the rib.

Having thus described our invention, what we claim is—

1. The combination, with an umbrella-rib and its cover, of a compressible metallic clamp, cap, or tip, said clamp, cap, or tip being constructed with an inward blunted projection, so that when clamped or compressed upon the cover it will not cut the same, and will secure the covering material firmly to the rib, substantially as set forth.

2. An umbrella or parasol cap, tip, or clamp, constructed with an annular groove, recess, or projection, in combination with a rib having near its outer end a groove, recess, or projection, substantially as and for the purpose described.

3. A clamp, tip, or cap for an umbrella-rib, said clamp, tip, or cap having an inward blunt bead or flange at or near its open end, between which bead or flange and the rib the umbrella-cover may be clamped without being cut, substantially as set forth.

4. In an umbrella, the combination, with the ribs thereof, provided with annular shoulders near the extremities, of the divided collars, with or without the elastic washer, adapted to fit over the same and secure the covering thereon, and the screw-tips for securing said collars in place, substantially as described.

In testimony whereof we have hereunto set our hands this 29th day of December, 1877.

ALFRED A. VALENTINE.
HENRY A. MORRISON.

Witnesses:
DANL. W. MORGAN,
WALTER C. HUBBARD.